United States Patent [19]

Bott

[11] 4,139,233
[45] Feb. 13, 1979

[54] SCREEN FOR THE WINDOW AT THE TOP OF A VEHICLE DOOR

[76] Inventor: John A. Bott, 931 Lakeshore Dr., Grosse Pointe Shores, Mich. 48236

[21] Appl. No.: 725,499

[22] Filed: Sep. 22, 1976

[51] Int. Cl.² .............................. A47H 3/00; B60J 1/08
[52] U.S. Cl. .................................. 296/84 M; 160/105; 160/354; 160/DIG. 2
[58] Field of Search ......... 160/105, 354, 368, DIG. 2; 296/84 M

[56] References Cited

U.S. PATENT DOCUMENTS

| | | | |
|---|---|---|---|
| 1,744,177 | 1/1930 | Schuler | 160/354 |
| 2,717,036 | 9/1955 | Harris | 160/354 |
| 2,870,454 | 1/1959 | Schippert et al. | 160/368 R |
| 2,873,800 | 2/1959 | Kogan | 160/105 |
| 2,937,700 | 5/1960 | Gibbons | 160/354 |
| 3,064,725 | 11/1962 | Roark | 160/105 |
| 3,805,872 | 4/1974 | Lorber | 160/DIG. 2 |
| 3,960,195 | 6/1976 | Marchbanks | 160/105 |

Primary Examiner—Richard A. Bertsch
Attorney, Agent, or Firm—Harness, Dickey & Pierce;

[57] ABSTRACT

A frame of cloth for supporting a screen at the central opening is slid downwardly over the top of a vehicle door to cover the window opening thereat containing a glass which is movable to raised and lowered position. The cloth of the frame has an inner strip of cloth secured thereto which forms a pocket which receives the top and side edges of the door in sealed relation therewith. The bottom of the frame engages the metal of the door and is secured thereto by magnetic means which may be a strip of magnetic material stitched, riveted or otherwise secured thereto or a hem may be stitched in the bottom in which a plurality of magnets are secured. When employed on the door at the driver side, a notch may be placed in the bottom edge of the cloth frame to extend over the supporting element of the rear view mirror. An elastic strip has one end attached to a side of the bottom open edge with the other end secured by a snap fastener or velcro.

1 Claim, 4 Drawing Figures

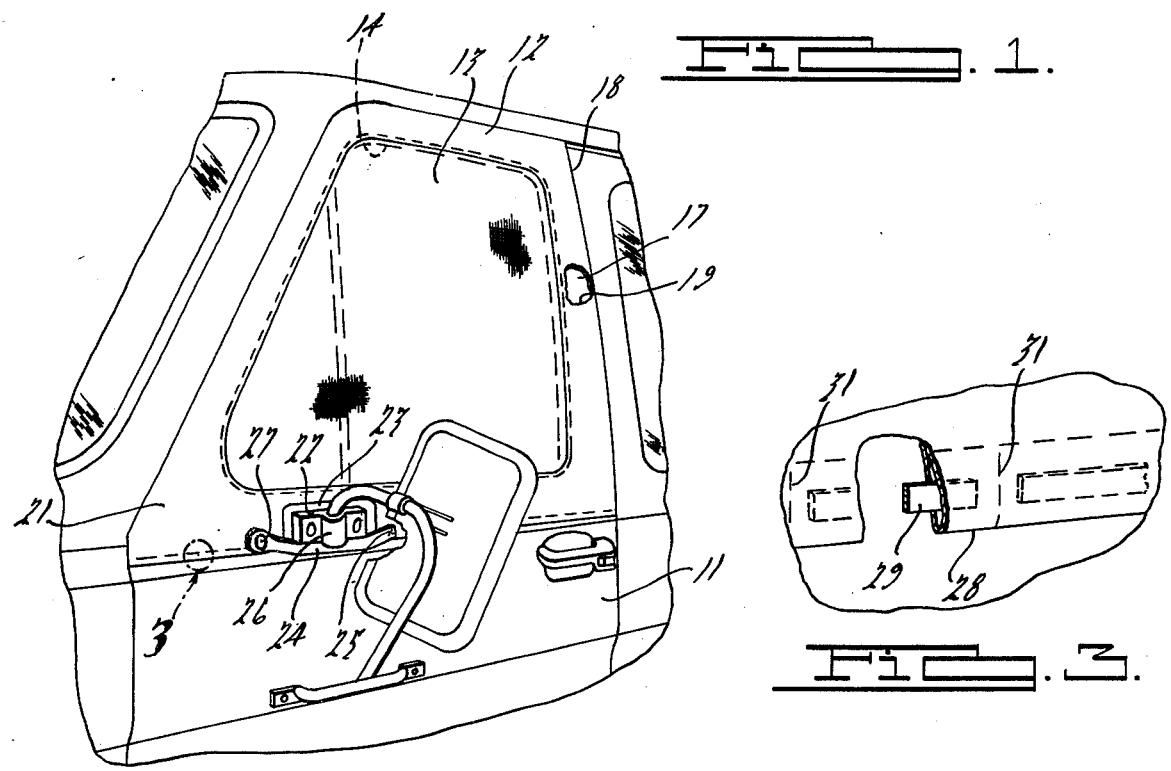
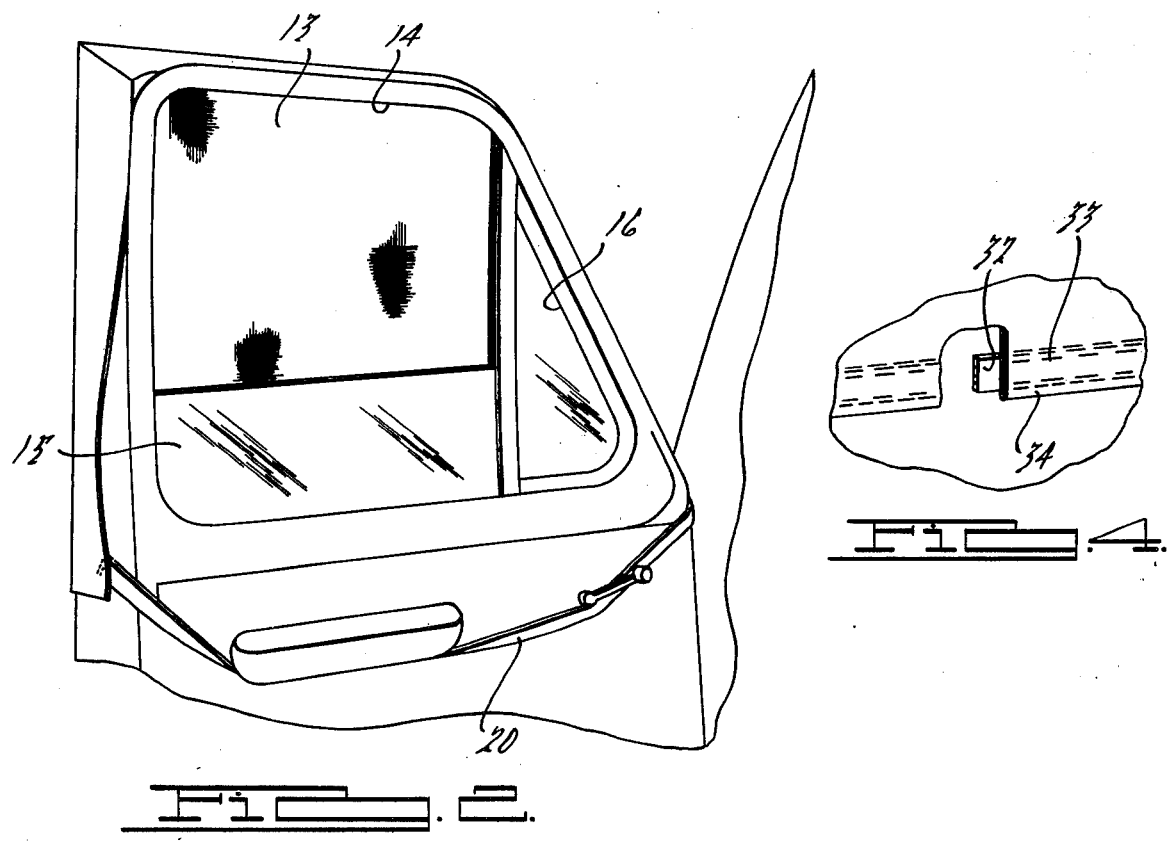

SCREEN FOR THE WINDOW AT THE TOP OF A VEHICLE DOOR

BACKGROUND OF THE INVENTION

While a frame of cloth for a screened opening has been employed heretofore at the window opening of a vehicle, it is believed that the use of a notch for the rear view mirror secured by an elastic strip and the provision of the magnet means for retaining the bottom of the frame secured to the metal below the window opening is new and patentable.

SUMMARY OF THE INVENTION

The invention pertains to the use of a fabric, cloth or the like having an outer dimension which is substantially that of the top of the vehicle door at the window opening over which a screen is secured to provide ventilation and to prevent insects from entering. A second strip of material is secured to the edge of the first strip to form a downwardly and inwardly presenting pocket along the top and side edge of the resulting frame. The frame supports a screen across the window opening when the top and side edges have pockets which receive the top and side edges of the door. The bottom edge of the cloth frame is secured to the metal below the door opening by magnets secured in a hem along the bottom edge or by a strip of magnetic material which is stitched, riveted or otherwise secured thereto. The magnetic means secures the bottom edge of the screen frame to the metal of the door so that the frame is sealed all around the door window edge against the entrance of insects.

When the frame is applied to the driver side of the vehicle, a notch is provided in the bottom frame edge which is preferably reinforced by a binding strip to one side of which an end of an elastic strip is secured, the other side having a securing element which secures the other end of the strip and secures the notched edge sealed to the metal of the door. The notch is omitted if the frame is to be employed on the door on the passenger side of the vehicle if no rear view mirror is employed thereat. The bottom edge of the cloth frame at the side edges has an elastic strip secured thereto which may be stretched over the arm rest on the interior of the door to hold the bottom of the side edges taut against the sides of the door at the bottom edge of the window opening.

BRIEF DESCRIPTION OF THE DRAWING

FIG. 1 is a view of the upper part of a vehicle door having a rear view mirror thereupon and a frame for a screen supported on the upper portion of the door at the window opening therein;

FIG. 2 is an inside view of the door of FIG. 1 in opened position with the screen mounted thereon;

FIG. 3 is an enlarged broken view of the structure illustrated in FIG. 1, taken within the circle 3 thereof, and FIG. 4 is a view of structure, similar to that illustrated in FIG. 3, showing a different form of construction.

DESCRIPTION OF THE PREFERRED EMBODIMENT

In FIG. 1, a door 11 is illustrated supported on the driver side of the vehicle on hinges located at the front for convenient safety reasons. When the vehicle is driven or when standing still without air conditioning, ventilation is provided by a frame 12 made of cloth, plastic or the like having a central opening covered by a screen 13 of plastic filaments or the like. The screen covers the opening 14 in the door when supported on the top portion thereof, the opening being closed by a window 15 which may be raised or lowered. The window opening 14 may also have a hinged ventilating panel 16 which is swingable to open and closed positions. The cloth frame 12 has a strip of cloth or other material 17 stitched, or otherwise secured at the top and side edge 18 to form a pocket 19 which extends over the top and front and rear side edges of the door to cover the door's window opening. An elastomeric strip 20 is secured to the bottom side corners of the frame with the central portion secured under the arm rest of the door, as illustrated in FIG. 3, for holding the edge pocket of the frame 12 in sealed relation to the top and side edges of the door.

A bottom portion 21 of the fabric frame has a notch 22 extending thereinto from the bottom edge which may be reinforced by a band 23 in position to engage the outer surface of the door when an elastomeric strip 24 is secured in position across the notch opening. The strip is fixed at the point 25 and is drawn along the bottom of supporting element 26 which in part supports a rear view mirror M at an appropriate position on the exterior of the door 11. The end of the strip 24 opposite the point 25 is secured by a snap button, velcro material or other reliable means to retain the strip 24 in the secured position designated by the numeral 27. To further retain the bottom portion 21 of the frame 12 in sealed relation to the door portion below the window opening 14, a hem 28 is formed therealong for retaining magnetic elements 29 in pockets within the hem which are defined by stitched or adherred lines 31. The magnets press the bottom edge of the cloth or fabric of the frame 12 against the metal of the door to thereby seal the bottom of the frame thereto.

A similar construction is illustrated in FIG. 4 wherein a strip of magnetic material 32 is secured by stitching 33 or other means to the bottom edge 34 of the frame 12 which functions in the same manner as the individual magnets 29 for holding the bottom edge of the frame 12 in sealed relation to the door. With such a construction the vehicle may be operated with the frame retained on the door or when the vehicle is standing provide ventilation for cooling the interior and the occupants of the vehicle while sealing the window opening against the ingress of insects. If the vehicle is employed as sleeping quarters, a frame with a screen may be applied to all of the doors so as to obtain cross-ventilation.

What is claimed:

1. A cover for the top of a vehicle door at the window opening comprising, a fabric material having the outer edge substantially the same shape as that of the outer edge of the top portion of the door at the window opening, said fabric having an opening substantially equal in size to that of the door window opening, a screen secured to the edge of the fabric at the window opening therein, a strip of material secured to the outer edge of said fabric at the top and sides thereof to form an inwardly facing U-shaped edge which receives the top and side edges of the door when moved downwardly thereover, an elastomeric strip having opposite ends secured to an inner side of said cover and adapted to engage a projection on the interior of said door so as to retain said U-shaped edge in overlying relationship to said top and side edges, means in the portion of the fabric below the screen for securing the fabric to the metal of the door below the window opening, an inverted U-shaped cut-out area provided in said fabric below the window opening for clearing an outwardly extending supporting element supporting a rear view mirror upon and spaced outwardly from the exterior side of the door, and a resilient strip of material secured to the outer side of said fabric and extending between said mirror and said supporting element, said resilient strip closing the open end of the U-shaped cut-out area to retain said fabric on said door adjacent said supporting element and cooperating with said elastomeric strip to retain said portion of the fabric below the screen in engagement with said door.

* * * * *